R. EMRICH.
CURB CHAIN BRACELET.
APPLICATION FILED JULY 16, 1914.
1,144,408.
Patented June 29, 1915.
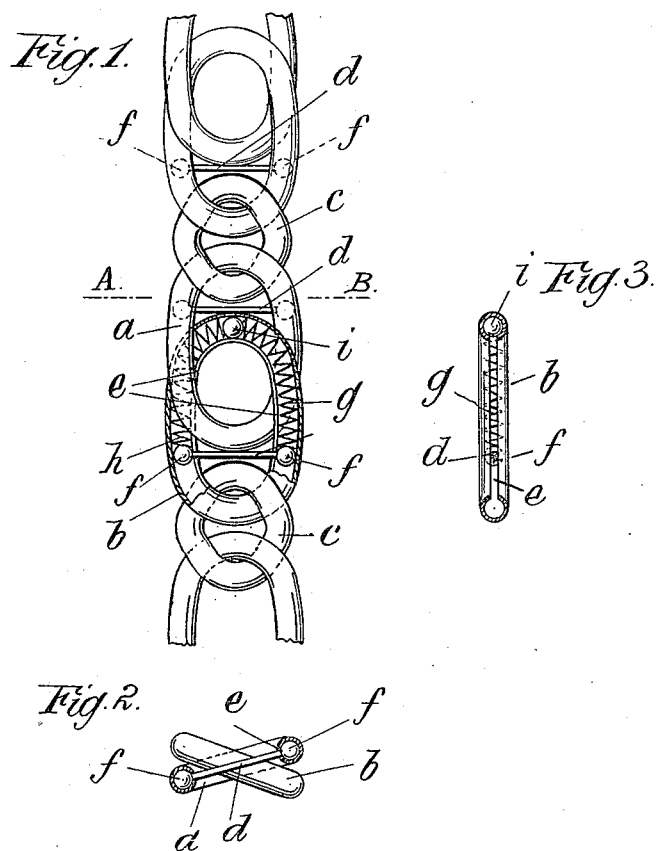

UNITED STATES PATENT OFFICE.

RICHARD EMRICH, OF PFORZHEIM, GERMANY, ASSIGNOR TO THE FIRM OF T. EMRICH, OF PFORZHEIM, GERMANY.

CURB-CHAIN BRACELET.

1,144,408.  Specification of Letters Patent.  Patented June 29, 1915.

Application filed July 16, 1914. Serial No. 851,291.

*To all whom it may concern:*

Be it known that I, RICHARD EMRICH, citizen of the German Empire, and resident of Pforzheim, in the Grand Duchy of Baden, Germany, have invented new and useful Improvements in Curb-Chain Bracelets, of which the following is a specification.

This invention relates to bracelets of the expansible type, and has for its object to provide an expansible curb-chain bracelet. To this end, the links are made hollow and are yieldingly held in their retracted positions by means of springs positioned in the interior of the links and substantially concealed thereby.

The invention is illustrated in the accompany drawing, in which:—

Figure 1 is a plan view, partly in section, of a portion of an expansible curb chain constructed in accordance with the invention and capable of being used as an expansible bracelet; Fig. 2 is a transverse section taken on the line A—B of Fig. 1; and Fig. 3 is a longitudinal section through one of the links.

A bracelet made from an expansible curb chain, such as shown in the drawing, may be made up of a plurality of pairs of main links $a$ and $b$, which pairs may be connected by means of the auxiliary links $c$. The main links $a$ and $b$ of each pair are yieldingly held in their retracted positions by means of a cross member secured to at least one of the links and which projects into the interior of an adjacent link where it coöperates with a spring to yieldingly resist relative separating movements of the links.

The cross members just referred to are shown at $d$, one being preferably, but not necessarily, provided for each link and secured thereto, so that its extremities are capable of projecting into the interior of the adjacent link. For this purpose, a continuous slot is provided at the inner edge of each of the main links, as best shown at $e$, in Fig. 3. As the links are moved longitudinally away from each other, it is obvious that the cross member $d$ secured to each of the main links will approach the extremity of the link into the interior of which it projects. Springs $g$ and $h$ are positioned in each of the main links and interposed between the extremity of the link and the extremities of the cross member $d$ which project into said link. The above-described movement of the cross member $d$, in approaching the extremity of the adjacent link, is, therefore, yieldingly resisted, as such movement tends to compress the springs in the link. The springs acting upon the extremities of the cross member serve to retain the main links in the retracted position shown in Fig. 1.

In the form of the device shown in the drawing, two springs $g$ and $h$ are used in each link, the adjacent ends of the springs being separated by a spherical member $i$. It is obvious that this member may be omitted, however, and a single spring employed instead of the two separate springs $g$ and $h$.

The extremities of the cross members $d$ are shaped in a suitable manner to properly coöperate with the extremities of the springs. In the present instance, the cross members are provided with spherical extremities, shown at $f$, although it is obvious that the specific shape of these extremital portions is immaterial to the invention.

In the drawing, both of the main links of each pair are provided with cross members $d$, but it is obvious that one of the cross members on one of the links and the coöperating springs in the other link may be dispensed with, in which case, the main links of each pair are yieldingly held in their retracted positions by means of one cross member only, secured to one of the links, and having extremital portions projecting into the interior of the adjacent link where they coöperate with the spring or springs positioned therein.

Although the expansible chain, as above described, is designed especially for use as an expansible bracelet, it is obvious that it may be used for other purposes.

What I claim is:—

1. A bracelet comprising a plurality of connected pairs of hollow links, springs positioned in said links, a cross member carried by each of the links and having extremital portions projecting into the interior of the adjacent link to co-act with the spring therein during relative movement of the links.

2. A bracelet comprising a plurality of pairs of connected links of the curb-chain type, at least one of the links of each pair being hollow and having a spring positioned therein, a cross member carried by the other link of each pair and having extremital portions projecting into the interior of the spring-containing link, to coact with the spring therein during relative movement of the links.

That I claim the foregoing as my invention, I have signed my name in presence of two witnesses, this third day of July, 1914.

RICHARD EMRICH.

Witnesses:
FREDK. BLAIBES,
ERNEST ENTENMANN.

Copies of this patent may be obtained for five cents each, by addressing the "Commissioner of Patents, Washington, D. C."